United States Patent Office 3,725,262
Patented Apr. 3, 1973

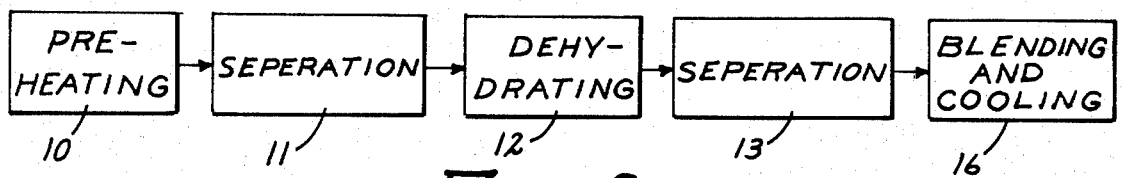
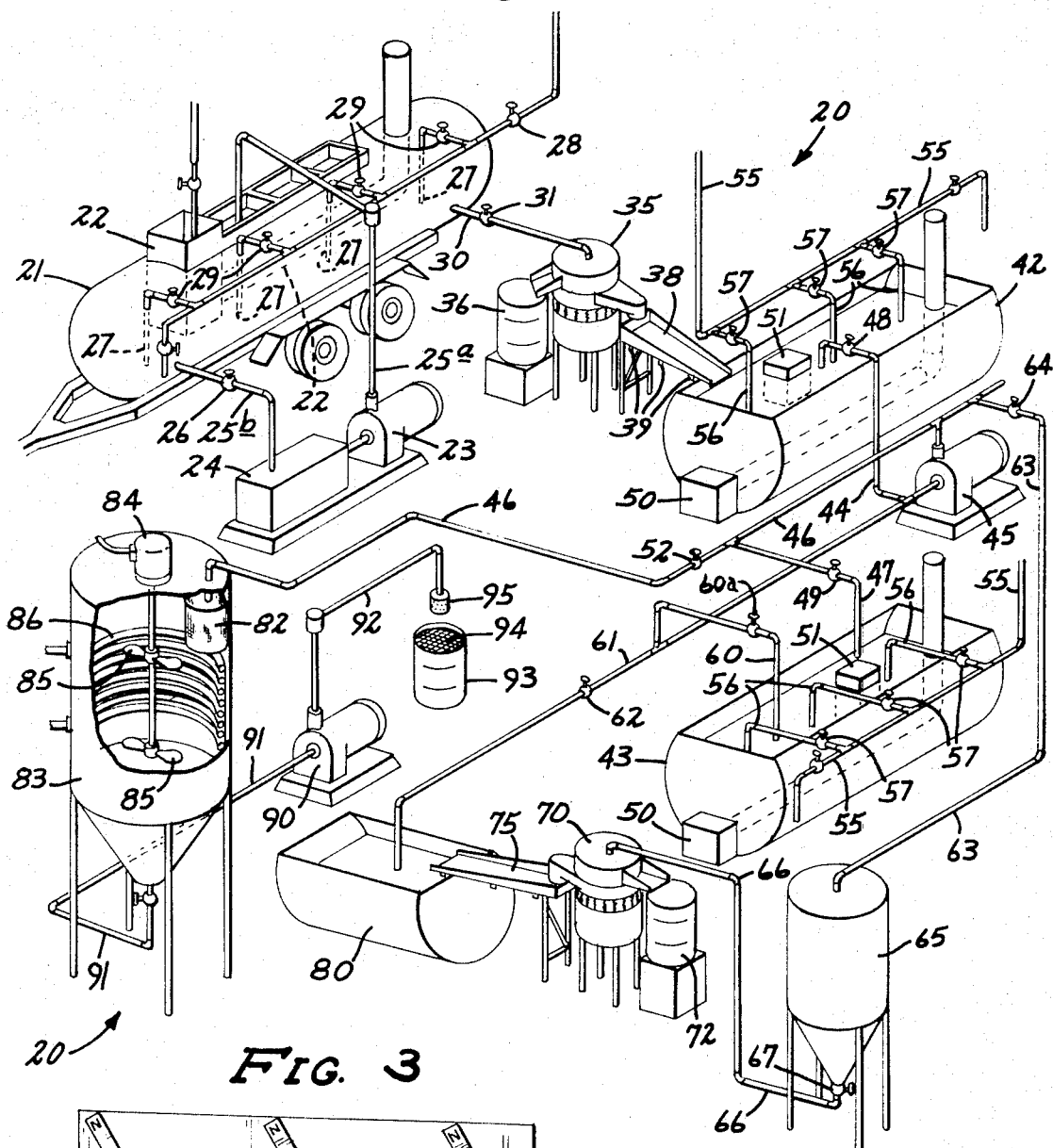
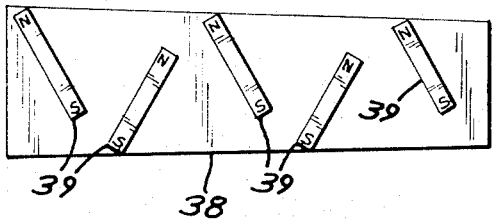

3,725,262
SYSTEM AND PROCESS FOR RECLAIMING FORGING COMPOUNDS
William G. Mattice and David A. Sanford, Eau Claire, Wis., assignors to Waste Research and Reclamation Co., Inc., Eau Claire, Wis.
Filed June 21, 1971, Ser. No. 154,809
Int. Cl. B01d 35/06
U.S. Cl. 210—42                    11 Claims

ABSTRACT OF THE DISCLOSURE

A process for reclaiming a graphite-containing forging compound wherein the removal of fine metallic contaminants (e.g. metallic shavings of less than 200 mesh size, .074 mm.) is accomplished utilizing magnetic separation. The forging compound is initially preheated to increase the viscosity thereof and, after undergoing filtering to remove solid contaminants larger than the graphite, the fine magnetically attractive contaminants are magnetically separated out of the forging compound. The compound is then sequentially heated to cause dehydration and cooled to ambient temperature while undergoing blending to provide a homogeneous product.

BACKGROUND OF THE INVENTION

The present invention is directed to a system and a process for reclaiming various liquid-solid mixtures.

Liquids frequently become contaminated during use. This is particularly true in the case of oils which can become contaminated by various contaminants (e.g. with metallic shavings) during many of their numerous uses (e.g. as a lubricant in "cold rolling" sheet metal). To recover the contaminated or waste oil, numerous reclamation processes are known in the art. The objective of these reclamation processes is to return the contaminated oils to as near as possible their original or fresh composition. In the case of oils, an inexpensive and effective reclaiming process is particularly desirable since the replenishment of the oil supply with fresh oil can often be accomplished only at great expense. Also, the recycling of liquids, and oils in particular, greatly aids in reducing the pollution of the environment as well as conserving natural resources.

Typically, the known oil reclamation processes involve removal of the solid contaminants by conventional filtering techniques (e.g. the sequential use of gradually finer mesh filters). Various centrifuging and stratification techniques have also been utilized to remove both solid and liquid contaminants. See, e.g. U.S. Pat. No. 3,265,212. Finally, it is well known that volatile liquid contaminants (e.g. water) can be removed by heating the oil to a temperature above the vaporization point of the liquid (e.g. 212° F. for water). While oil reclamation processes utilizing one or more of these techniques frequently necessitate complex and expensive apparatus, they are for the most part effective in providing a reclaimed oil having a generally high quality.

However, none of the above-enumerated techniques can be successfully utilized to reclaim an oil (or for that matter, any liquid-solid mixture) which has finely divided particles suspended therein in its original or fresh state. For example, oils having finely divided graphite, mica, copper, aluminum, glass, etc. in suspension therein are commonly used for a wide variety of machining and lubricating purposes. Such solid additives are frequently referred to as the "parting media" and the oil as the "vehicle" or "carrier." In the case of a graphite suspension in oil, the oil is commonly referred to as a "forging compound." With this type of oil, utilization of the known reclamation techniques results not only in the removal of the solid contaminants, but also in the removal of the finely divided graphite, mica, copper, etc. This, of course, is highly undesirable since the solid additive must then be replenished at great cost and expenditure of time. Thus, there is a large commercial need for a process for reclaiming the many liquid-solid mixtures such as forging compounds which become contaminated in use.

SUMMARY OF THE INVENTION

The reclamation system and process provided by the present invention includes the step of removing the finely divided contaminants by magnetic separation. A separate filtering operation removes contaminants larger than the solid components originally in suspension in the liquid-solid mixture. Volatile liquid contaminants are removed by heating the mixture above the vaporization temperature thereof (e.g. above 212° F. in the case of water). In the preferred embodiment, the mixture is continuously circulated during the heating operation and further agitated by injection of a jet of steam so as to maintain the solid components of the mixture in suspension. In this preferred process, the mixture is again subjected to further magnetic separation and filtering after the heating operation. The mixture is then cooled while undergoing a blending operation to provide a homogeneous product.

The present process has been found to provide high quality reclamation of a wide variety of liquid-solid mixtures. Further, the process is particularly desirable in reclaiming forging compounds wherein the solid contaminants are typically small metallic fillings, shavings, and the like, which can be readily removed by magnetic separation. Among other advantages which will become apparent from reading the Detailed Description hereinbelow, it will be seen that the present process does not necessitate highly complex and expensive apparatus.

BRIEF DESCRIPTION OF THE DRAWINGS

FIG. 1 is a flow diagram of the present reclamation process;

FIG. 2 is a diagrammatical view of the apparatus utilized to carry out the present process; and FIG. 3 is an enlarged bottom view of the magnetic separation apparatus shown in FIG. 2.

DETAILED DESCRIPTION OF THE PREFERRED EMBODIMENT

Since the present invention is particularly desirable in reclaiming liquid-solid mixtures commonly referred to as "forging compounds," the description hereinbelow will be directed solely to the reclamation of such a compound. Typically, a forging compound is composed of a heavy viscosity mineral oil (e.g. 90 wt.), finely divided graphite (e.g. 5-45% by weight of oil), various animal fats (e.g. 1-15% by weight of oil), and a small quantity of calcium soap suspended in the mineral oil. The graphite is generally amorphous and commonly passable through a 200 mesh screen (i.e. the graphite particles are commonly about .074 mm. and smaller in size). For some applications, clay, or additional calcium soap is added to the mineral oil to increase its viscosity. Such forging compounds are commercially available.

In use, a forging compound often times becomes contaminated with such contaminants as metal scales, metal filings, and floor sweepings. For the most part, these contaminants are magnetically attractive. The size of the contaminants will range from very small particles (e.g. 50 microns) to relatively large objects (e.g. nuts and bolts). To obtain high quality reclamation, all such solid contaminants (both large and small) must be removed from the final product.

A general understanding of the present invention can be obtained from a brief description of the flow diagram shown in FIG. 1. As shown, a contaminated forging compound undergoes preheating 10 for increasing the viscosity of the compound. This facilitates flow and further operation on the compound (e.g. filtering) within the reclamation system. The preheated compound then undergoes a separation operation 11 including (1) centrifugal filtering to remove the solid contaminants larger than the graphite (e.g. larger than about .07 mm.) and (2) removal of the magnetically attractive contaminants by magnetic separation. The forging compound then undergoes a heating operation 12 to remove volatile liquid contaminants. Since water is the primary liquid contaminant, heating the forging compound to a temperature about 212° F. (e.g. 250° F.) substantially removes all the liquid contaminants. The dehydrated compound then undergoes a further or second separation operation 13 similar to operation 11. It should be understood, however, that operation 13 is unnecessary in the case where operation 11 removes the solid contaminants to such an extent that the forging compound is of sufficiently high quality for reuse. Finally, the forging compound undergoes a cooling and blending operation 16. In this operation, the heated forging compound is cooled to ambient temperature while undergoing a blending operation for providing a homogeneous product.

Turning now to FIG. 2, a system generally designated 20 is illustrated for achieving the reclamation process provided by the present invention. A description of the apparatus comprising system 20 follows.

THE PREHEATING APPARATUS

In the embodiment shown, a contaminated forging compound is brought to the reclamation apparatus in a mobile tank 21. A conventional propane heater 22 extends along the bottom of tank 21 for preheating the forging compound decreasing the viscosity thereof. Tank 21 is connected to a conventional liquid pump 23 and a circulating tank 24 through conduits 25a and 15b. A valve 26 in conduit 25b allows termination of the flow of forging compound through the pump 23 and circulating tank 24.

Preferably, tank 21 is provided with a plurality of stationary steam nozzles 27 which are positioned so as to inject jets of steam into tank 21 along the bottom thereof. The steam nozzles 27 are connected to a source of steam (not shown) and valves 28 and 29 are provided for controlling injection of steam into tank 21. It should be understood, however, that a movable steam lance (not shown) insertable into tank 21 through an opening in the top thereof can be utilized instead of the stationary nozzles 27.

The forging compound is exhausted from tank 21 to the next stage of operation through a conduit 30 in liquid communication with tank 21. A valve 31 in condit 30 controls the flow of forging compound therethrough.

THE INITIAL SEPARATION APPARATUS

The forging compound flowing through conduit 30 is exhausted into an electrically energized filter or separator 35. The separator 35 is preferably a screening device that vibrates about its center of mass. One such separator is the commercially available Sweco Vibro-Energy Separator Model No. LS30C66. The screen (not shown) utilized in separator 35 preferably has a mesh size in the range of 20–50 mesh. A stainless steel screen having a 35 mesh with .0215 inch openings has been found particularly desirable. Other mesh sizes can of course be utilized dependent on the quality of reclamation desired and the size of the suspended graphite. It should be understood, also, that numerous types of separators of filtering apparatus can be utilized to provide the function of the Sweco separator 35. For instance, a conventional shaker screen can be utilized to remove contaminants having a larger size than the graphite suspension in the forging compound. As shown, a barrel 36 receives the waste contaminants discharged from the separator 35.

The forging compound is exhausted from separator 35 onto a magnetic separator in the form of a downwardly inclined, magnetic trough 38. As can be seen particularly well in FIG. 3, magnetic trough 38 has a plurality of bar magnets 39 fastened to the underside thereof in an alternating diagonal pattern. This pattern has been found to facilitate maximum flow rate of the forging compound along trough 38. It should be understood that numerous alternative magnetic separators can be utilized. For instance, a separator having rotating magnets and a wiper for continuously removing the contaminants collected by the magnets can also be utilized.

THE DEHYDRATION APPARATUS

The forging compound which flows the entire length of magnetic trough 38 is exhausted into an open dehydration tank 42. As shown, an overflow dehydration tank 43 is connected to tank 42 through a conduit 44, a pump 45, and conduits 46 and 47. The tank 43 receives forging compound introduced into tank 42 subsequent to the compound reaching a given level within tank 42. If necessary, additional tanks can be utilized to receive the excess compound dependent on the size of mobile tank 21 and the speed at which the reclamation process is to proceed. Conduits 44 and 47 include conventional valves 48 and 49, respectively, for controlling the flow of forging compound therethrough. A valve 52 is positioned in conduit 46 downstream from the connection of conduit 47 thereto.

A conventional propane heater 50 extends along the bottom of each of the tanks 42 and 43. As explained subsequently, heaters 50 raise the temperature of the forging compound within tanks 42 and 43 to a temperature above the vaporization point of water (the primary liquid contaminant). Apparatus (not shown) for automatically terminating the heating operation when the forging compound reaches a given temperature (e.g. 250°) is preferably provided in tanks 42 and 43.

A conventional circulating pump 51 is positioned within each of the dehydration tanks 42 and 43 for circulating or agitating the forging compound within the respective tanks during the dehydration operation. A conventional gear driven pump has been found particularly desirable. However, numerous alternative circulating pumps or agitating devices can also be utilized.

Steam injection means are associated with each of the dehydration tanks 42 and 43 for causing additional agitation of the forging compound. As shown, the steam injection means includes a conduit 55 connected to a steam source (not shown) and a plurality of branch conduits 56 connected to conduit 55. Conduits 56 extend into tanks 42 and 43 to a position adjacent the bottom thereof. A valve 57 in each of the conduits 56 controls the flow of steam therethrough.

THE SECOND SEPARATION APPARATUS

An outlet conduit 60 extends into tank 43 to a position adjacent the bottom thereof. Conduit 60 is connected to a conduit having a valve 62 therein and which communicates with pump 45, and a conduit 63. Conduit 63 has a valve 64 therein and empties into a holding tank 65 having a conduit in communication therewith connecting tank 65 to a second Sweco separator 70. A valve 67 positioned within conduit 66 controls the flow of forging compound therethrough to separator 70. Separator 70 is preferably a Sweco Model S18 separator which is similar to separator 35 except for the utilization therein of a smaller mesh screen to further filter the forging compound. A 80 mesh stainless steel screen is preferred. A barrel 72 is provided to receive the discharge waste from separator 70. The forging compound filtered within separator 70 is exhausted onto a magnetic trough 75 similar to the magnetic trough 38 previously described.

A holding tank 80 receives the forging compound exhausted from the magnetic trough 75. A screen 82 mounted within a holding tank 83 is connected to holding tank 80 through conduit 46, pump 45 and conduit 61. Typically, the screen 82 is of a mesh size in the range 80 to 200 mesh. The forgoing compound filtered by screen 82 is exhaused into tank 83.

THE BLENDING AND COOLING APPARATUS

A conventional electrical blender or mixer 84 is mounted in holding tank 83. Blender 84 includes blades 85 within tank 83 for agitating the forging compound therein. One suitable blender is the Lightnin Mixer Model LDG–150. Numerous alternative blenders are commercially available. A cooling coil 86 is positioned within tank 83 extending circumferentially about the walls thereof.

A pump 90 is connected to tank 83 through conduit 91. A storage container 93 having a screen 94 mounted in the opening therein receives the reclaimed compound exhausted from a conduit 92 connected to pump 90. Preferably, conduit 92 is pivotally mounted to pump 90 so as to be movable to a number of storage containers (not shown) which may be positioned adjacent to container 93. A conventional constant flow magnetic filter 95 is mounted at the outlet of conduit 92 above screen 94.

THE RECLAIMING OPERATION

The operation of the reclamation system can be described as follows. The contaminated or waste forging compound is delivered to the recalamation system in tank 21. The propane heater 22 is activated to heat the forging compound to a temperature in the range 160° F.–210° F. (e.g. 180° F.). When this temperature is reached, valve 26 is opened and pump 23 is activated to continuously recirculate the forging compound within tank 21. Concurrently, steam is injected into the tank 21 through steam nozzles 27 to further agitate the compound. Such recirculation and agitation replaces in suspension any material which has settled to the bottom of tank 21. This operation is allowed to continue until the contaminated compound is generally homogeneous. At this phase of the process, a test (or series of tests) is ordinarily conducted to determine the viscosity of the forging ordinarily conducted to determine the viscosity of the forging compound. Where necessary, oil is added to decrease the viscosity of the compound to the desired level or until it is at least flowable for movement through the reclamation equipment.

When the preheating operation is completed, valve 31 is opened and the preheated and homogeneous compound is exhausted through conduit 30 into separator 35. Separator 35 remove solid contaminants in the forging compound having a size greater than the graphite suspension (e.g. larger than about .07 mm.). On exhaustion from separator 35, the forging compound flows through the magnetic trough 38. Here, the magnetically attractive solid contaminants are removed from the forging compound by magnets 39. The size of the contaminants removed will range from very small (e.g. 50 microns) to relatively large objects.

After the first separation operation, the forging compound flows continuously into dehydration tank 42. Where tank 42 is not of sufficient size to contain the entire quantity of forging compound undergoing reclamation, excess compound is pumped into tank 43. Propane heaters 50 then heat the compound to a temperature in the range 212° F.–275° F., preferably 250° F., so as to remove all the water contaminant in the compound. The operation of propane heaters 50 is terminated by conventional temperature control apparatus (not shown) after the compound temperature reaches 250° F. During the heating operation, circulating pumps 51 continuously circulate the forging compound within tanks 42 and 43. This greatly reduces the amount of graphite in the heated compound which settles to the bottom of the tanks. At the end of the deydration operation, a jet of steam is injected into tanks 42 and 43 through conduits 56. This causes agitation of the forging compound assuring that any graphite which may have settled out of the compound is replaced in suspension. It is highly desirable that this steam be as dry as possible so as not to add moisture to the dehydrated compound. For example, a steam jet at 300° F. and 120 p.s.i. is desirable.

With valve 62 in its closed position and valves 60a and 64 in their open position, the hydrated forging compound is pumped out of tanks 42 and 43 through conduits 44, 46, 47, 60, 61 and 63 into the holding tank 65. During the pumping operation, steam is continuously injected into the tanks 42 and 43 until the entire quantity of compound is pumped therefrom. On opening of valve 67, the compound is exhausted from tank 65 and flows through the separator 70 and magnetic trough 75. After this second separation operation, valves 48, 60a and 64 are closed and valves 52 and 62 are opened. The forging compound is then pumped out of holding tank 80 through conduits 61 and 46 and through screen 82 for further filtration. The forging compound is blended and cooled by blender 84 and cooling coils 86. The blender 84 agitates the forging compound within tank 84 until a good homogeneous product is obtained. The cooling coils 86 bring the temperature of the forging compound to approximately 140°. The concurrent blending and cooling provides a homogeneous product with a minimum amount of stratification. During this operation, graphite, oil, or other solid additives or agents are added to the forging compound to bring the product within the tolerances desired. The amounts of agents needed to be added are determined by conventional viscosity and precent graphite tests.

The reclaimed forging compound is pumped out of holding tank 83 through conduits 91 and 92. Conduit 92 exhausts the reclaimed forging compound into a storage container 93. The conventional constant flow magnetic filter 95 positioned at the outlet of conduit 92 magnetically attracts and removes from the compound any remaining magnetically attractive contaminants from accidentally (or otherwise) entering the barrel.

From the above description, it can be seen that the present invention provides high quality reclamation of solid-liquid mixtures without removing the solid components of the mixture from suspension. Since it will be obvious to one skilled in the art that numerous modifications can be made to the embodiment described hereinabove, it is out intent to be limited solely by the spirit and scope of the appended claims.

What is claimed is:

1. A process for reclaiming a contaminated liquid-solid mixture, comprising:
   (a) removing magnetically attractive contaminants in the mixture by magnetic separation;
   (b) filtering the mixture to remove solid contaminants therein of a size greater than the solid components of the mixture;
   (c) heating the mixture to remove volatile liquid contaminants;
   (d) cooling the heated mixture to ambient temperature; and
   (e) blending the cooled mixture to provide a homogeneous mixture throughout.

2. The reclamation process of claim 1 including the step of agitating the liquid-solid mixture during said heating to maintain in suspension the solid components of the mixture.

3. The reclamation process of claim 2 wherein said liquid-solid mixture has a petroleum base and the volatile liquid contaminant removed by said heating is primarily water.

4. The reclamation process of claim 3 wherein:
    (a) said agitating includes continuously circulating the mixture during said heating and injecting a jet of steam into said mixture to cause turbulence therein on termination of said heating; and
    (b) said cooling and said blending of the mixture occurs essentially concurrently.

5. The reclamation process of claim 3 including the step of preheating the contaminated liquid-solid mixture to a temperature below 212° F. so as to increase the viscosity thereof.

6. A process for reclaiming a petroleum based forging compound having a graphite component, comprising:
    (a) removing magnetically attractive contaminants in the forging compound by magnetic separation;
    (b) filtering the forging compound to remove contaminants having a greater size than the graphite component of the compound;
    (c) heating the forging compound to remove the water therein;
    (d) agitating the forging compound during said heating to maintain in suspension the graphite components; and
    (e) cooling the forging compound to ambient temperature while blending the compound to provide a homogeneous compound.

7. The reclamation process of claim 6 wherein said agitating includes circulating the forging compound during said heating and injecting a jet of steam into the compound for causing turbulence thereof on termination of said heating.

8. The reclamation process of claim 7 includin gthe step of preheating the forging compound to a temperature less than 212° F. for increasing the viscosity thereof.

9. The reclamation process of claim 8 wherein said preheating raises the temperature of the forging compound to 160°–210° F. and said heating further raises the temperature of the forging compound to 212°–275° F.

10. A system for reclaiming a forging compound, comprising:
    (a) conduit means for providing a flow of the forging compound;
    (b) means in liquid communication with said conduit means for magnetically removing the magnetically attractive contaminants in the forging compound;
    (c) filtering means in liquid communication with said conduit means downstream of said magnetic remover means for removing solid contaminants from the forging compound having a greater size than the solid components of the compound;
    (d) a dehydration tank communicating with said filtering means;
    (e) a heating element associated with said dehydration tank for heating the forging compound introduced therein to a temperature above 212° F. to remove the water contaminant therein;
    (f) means positioned within said dehydration tank for agitating the forging compound during said heating to maintain in suspension the solid components of the compound; and
    (g) cooling and blending means in liquid communication with said conduit means for cooling the heated forging compound exhausted from said dehydration tank to ambient temperature and for blending the forging compound to an essentially homogeneous compound.

11. The reclamation system of claim 10 including means in liquid communication with said conduit means upstream of said magnetic remover means for preheating said forging compound to a temperature less than 212° F. to increase the viscosity thereof.

References Cited
UNITED STATES PATENTS 3,265,212   8/1966   Bonsall, Jr. ———————— 210—73
3,456,797   7/1969   Marriott ———————— 210—223 X JOHN ADEE, Primary Examiner U.S. Cl. X.R.

209—232; 210—71, 73, 179, 181, 223, 260